United States Patent
Wang et al.

(10) Patent No.: US 7,348,553 B2
(45) Date of Patent: Mar. 25, 2008

(54) ASPECTS OF MASS SPECTRAL CALIBRATION

(75) Inventors: Yongdong Wang, Wilton, CT (US); Ming Gu, Yardley, PA (US)

(73) Assignee: Cerno Bioscience LLC, Danbury, CT (US)

( * ) Notice: Subject to any disclaimer, the term of this patent is extended or adjusted under 35 U.S.C. 154(b) by 183 days.

(21) Appl. No.: 11/261,440

(22) Filed: Oct. 28, 2005

(65) Prior Publication Data

US 2006/0169883 A1 Aug. 3, 2006

Related U.S. Application Data

(60) Provisional application No. 60/623,114, filed on Oct. 28, 2004.

(51) Int. Cl.
*H01J 49/26* (2006.01)
*B01D 59/44* (2006.01)
*B01D 15/08* (2006.01)

(52) U.S. Cl. .................. 250/282; 250/281; 250/286; 250/424; 702/27; 702/28; 702/85

(58) Field of Classification Search .............. None
See application file for complete search history.

(56) References Cited

U.S. PATENT DOCUMENTS

2007/0023633 A1* 2/2007 Wang et al. ............ 250/282
2007/0136017 A1* 6/2007 Wang et al. ............ 702/85

* cited by examiner

*Primary Examiner*—Nikita Wells
(74) *Attorney, Agent, or Firm*—David Aker (57) ABSTRACT

A method for calibrating and analyzing data from a mass spectrometer, comprising the steps of acquiring raw profile mode data containing mass spectral responses of ions with or without isotopes; calculating theoretical isotope distributions for each of at least one calibration ion based on elemental composition; convoluting the theoretical isotope distributions with an initial peak shape function to obtain theoretical isotope profiles for each ion; constructing a peak component matrix including the theoretical isotope profiles for calibration ions as peak components; performing a regression analysis between the raw profile mode mass spectral data and the peak component matrix; and reporting the regression coefficients as the relative concentrations for each of the components. A mass spectrometry system operated in accordance with the method and a computer readable medium having program code thereon for performing the method.

21 Claims, 8 Drawing Sheets

ASPECTS OF MASS SPECTRAL CALIBRATION

This application claims priority, under 35 U.S.C. §119(e), from U.S. provisional application Ser. No. 60/623,114 filed on Oct. 28, 2004; and the entire teachings of that application is hereby incorporated by reference, in its entirety.

CROSS-REFERENCE TO RELATED APPLICATIONS

This application is related to the following patent applications:

U.S. Ser. No. 10/689,313 filed on Oct. 20, 2003 and International Patent PCT/US2004/034618 filed on Oct. 20, 2004 which claims priority therefrom and designates the United States of America as an elected state.

U.S. Provisional patent applications 60/466,010; 60/466,011 and 60/466,012 all filed on Apr. 28, 2003, and International Patent Applications PCT/US2004/013096 and PCT/US04/013097 both filed on Apr. 28, 2004 and designating the United States of America as an elected state.

The entire teachings of these patent applications are hereby incorporated herein by reference, in their entireties.

BACKGROUND OF THE INVENTION

1. Field of the Invention

Figure 1:
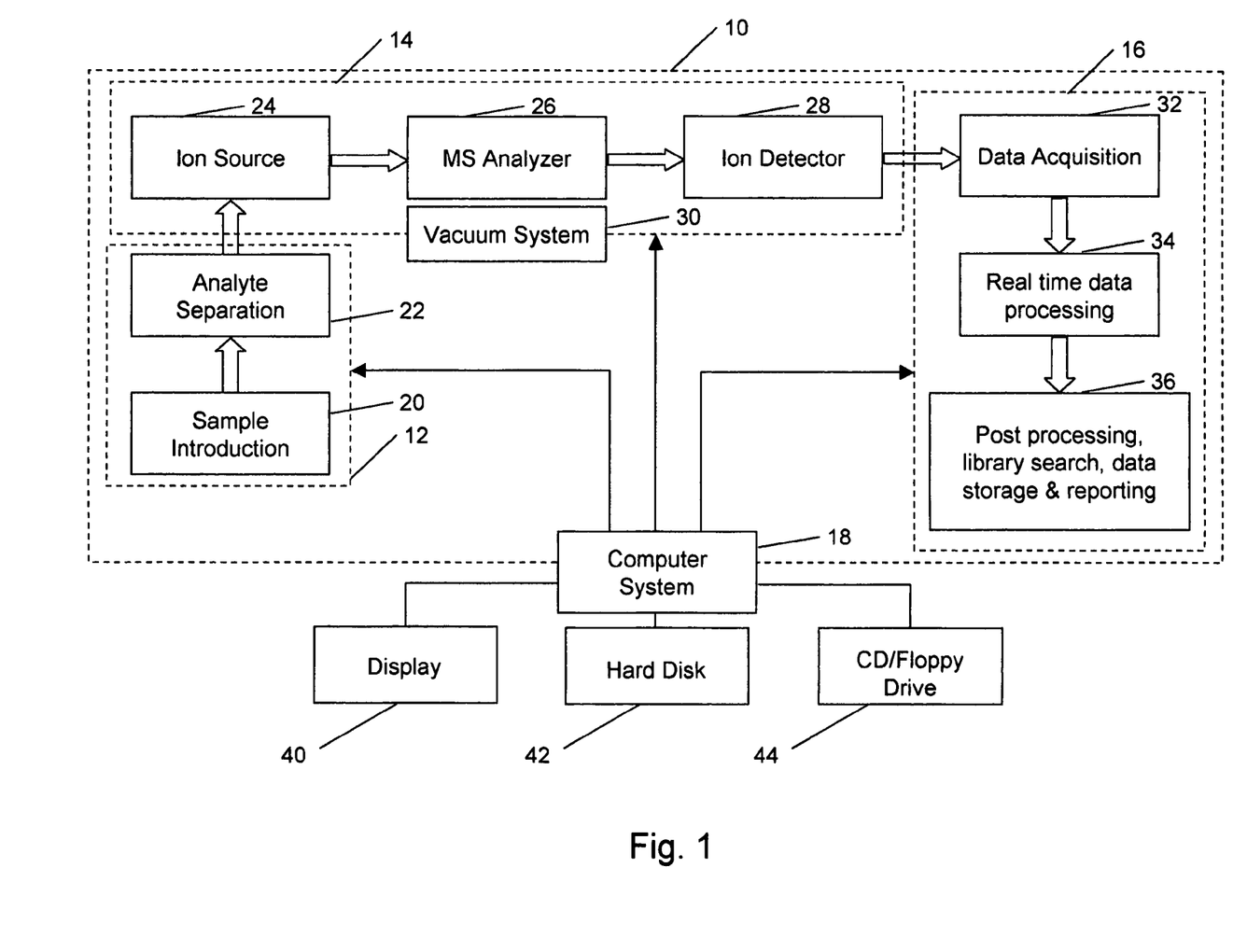
FIG. 1 is a block diagram of an analysis system in accordance with the invention, including a mass spectrometer.

The present invention relates to improvements and applications with respect to the teachings of the above referenced patent applications in the general area of mass spectrometry as shown in FIG. 1 including ion mobility spectrometry (IMS) where the vacuum is absent.

2. Background Art

Accurate mass (AM) measurements have been widely utilized for a variety of applications including determination of metabolites, identification of peptides for database searching, and confirmation of pharmaceuticals and their impurity and degradation products. The attractiveness of the AM technique is its capability of determining elemental composition of an unknown molecule with the mass accuracy at low or below ppm level. As a result, AM measurements alone can often provide the definite structure of the molecule so that usually required tandem mass spectrometry (MS/MS) analysis for structural elucidation is no longer necessary. In addition, when applied to MS/MS, AM analyses of precursor and product ions are always valuable confirmation for structural elucidation of molecules of interest. While the technique has generated very impressive results and has become increasingly popular, the majority of the mass spectrometry community cannot afford access to the instruments with AM capability such as Fourier Transform mass spectrometer (FTMS), double focusing sector instrument, tandem time of flight (TOF/TOF), and quadrupole time of flight (qTOF).

Fortunately, the novel mass spectrometry data processing technology described in the cross-referenced patent applications makes it possible to perform AM analysis on a low resolution mass spectrometer and to improve mass accuracy on a high resolution mass spectrometer. Specifically, the details on this technology are described in U.S. patent application Ser. No. 10/689,313. Briefly, the technology achieves high mass accuracy by unique mass spectrometry calibration procedures including instrument (external) and an internal calibration. The external calibration employs sophisticated mathematics and statistics to calculate exact mass location and isotopic distribution, to determine instrument peak shape functions, and to derive calibration filters from a set of calibration ions, while an internal calibration is used to compensate for instrument drifting in real time or near real time analysis.

The present invention describes the development of mass spectral calibration involving overlapped isotope clusters, tandem MS, and higher resolution scan modes on typically a lower resolution mass spectrometer.

SUMMARY OF THE INVENTION

The present application is directed to the following improvements:

1. Approach to use known but overlapped ions such as those from isotope labeled experiments for mass spectral calibration.
2. A novel way to perform the total calibration outlined in the above-mentioned early patent applications for tandem MS through the use of isotope tags and/or known peptides or other known ions such as parent drugs and/or its fragments.
3. Achieving higher mass accuracy through the use of a zoom scan or other higher resolution scan feature on a conventional ion trap or quadrupole instrument of nominally unit mass resolution.
4. Avoiding nonlinearity in the monoisotopic peaks of standard ions and using M+1 or M+2 isotope cluster for mass spectral calibration.

Each of these aspects will be described below along with preliminary results to demonstrate their utilities.

BRIEF DESCRIPTION OF THE DRAWINGS

The foregoing aspects and other features of the present invention are explained in the following description, taken in connection with the accompanying drawings, wherein like numerals indicate like components, and wherein.

DETAILED DESCRIPTION OF THE PREFERRED EMBODIMENTS

Referring to FIG. 1, there is shown a block diagram of an analysis system 10, that may be used to analyze proteins or other molecules, as noted above, incorporating features of the present invention. Although the present invention will be described with reference to the embodiments shown in the drawings, it should be understood that the present invention can be embodied in many alternate forms of embodiments. In addition, any suitable types of components could be used.

Analysis system 10 has a sample preparation portion 12, a mass spectrometer portion 14, a data analysis system 16, and a computer system 18. The sample preparation portion 12 may include a sample introduction unit 20, of the type that introduces a sample containing molecules of interest to system 10, such as Finnegan LCQ Deca XP Max, manufactured by Thermo Electron Corporation of Waltham, Mass., USA. The sample preparation portion 12 may also include an analyte separation unit 22, which is used to perform a preliminary separation of analytes, such as the proteins to be analyzed by system 10. Analyte separation unit 22 may be any one of a chromatography column, a gel separation unit, such as is manufactured by Bio-Rad Laboratories, Inc. of Hercules, Calif., and is well known in the art. In general, a voltage or PH gradient is applied to the gel to cause the molecules such as proteins to be separated as a function of one variable, such as migration speed through a capillary tube (molecular weight, MW) and isoelectric focusing point (Hannesh, S. M., *Electrophoresis* 21, 1202-1209 (2000)) for one dimensional separation or by more than one of these variables such as by isoelectric focusing and by MW (two dimensional separation). An example of the latter is known as SDS-PAGE.

The mass separation portion 14 may be a conventional mass spectrometer and may be any one available, but is preferably one of MALDI-TOF, quadrupole MS, ion trap MS, or FTICR-MS. If it has a MALDI or electrospray ionization ion source, such ion source may also provide for sample input to the mass spectrometer portion 14. In general, mass spectrometer portion 14 may include an ion source 24, a mass spectrum analyzer 26 for separating ions generated by ion source 24 by mass to charge ratio (or simply called mass), an ion detector portion 28 for detecting the ions from mass spectrum analyzer 26, and a vacuum system 30 for maintaining a sufficient vacuum for mass spectrometer portion 14 to operate efficiently. If mass spectrometer portion 14 is an ion mobility spectrometer, generally no vacuum system is needed.

The data analysis system 16 includes a data acquisition portion 32, which may include one or a series of analog to digital converters (not shown) for converting signals from ion detector portion 28 into digital data. This digital data is provided to a real time data processing portion 34, which process the digital data through operations such as summing and/or averaging. A post processing portion 36 may be used to do additional processing of the data from real time data processing portion 34, including library searches, data storage and data reporting.

Computer system 18 provides control of sample preparation portion 12, mass spectrometer portion 14, and data analysis system 16, in the manner described below. Computer system 18 may have a conventional computer monitor 40 to allow for the entry of data on appropriate screen displays, and for the display of the results of the analyses performed. Computer system 18 may be based on any appropriate personal computer, operating for example with a Windows® or UNIX® operating system, or any other appropriate operating system. Computer system 18 will typically have a hard drive 42, on which the operating system and the program for performing the data analysis described below is stored. A drive 44 for accepting a CD or floppy disk is used to load the program in accordance with the invention on to computer system 18. The program for controlling sample preparation portion 12 and mass spectrometer portion 14 will typically be downloaded as firmware for these portions of system 10. Data analysis system 16 may be a program written to implement the processing steps discussed below, in any of several programming languages such as C++, JAVA or Visual Basic.

One aspect of the invention involves calibrating a mass spectrometer when multiple ions of known elemental compositions, called calibration ions, are available but overlapped with each other in their mass spectral response.

Figure 2:
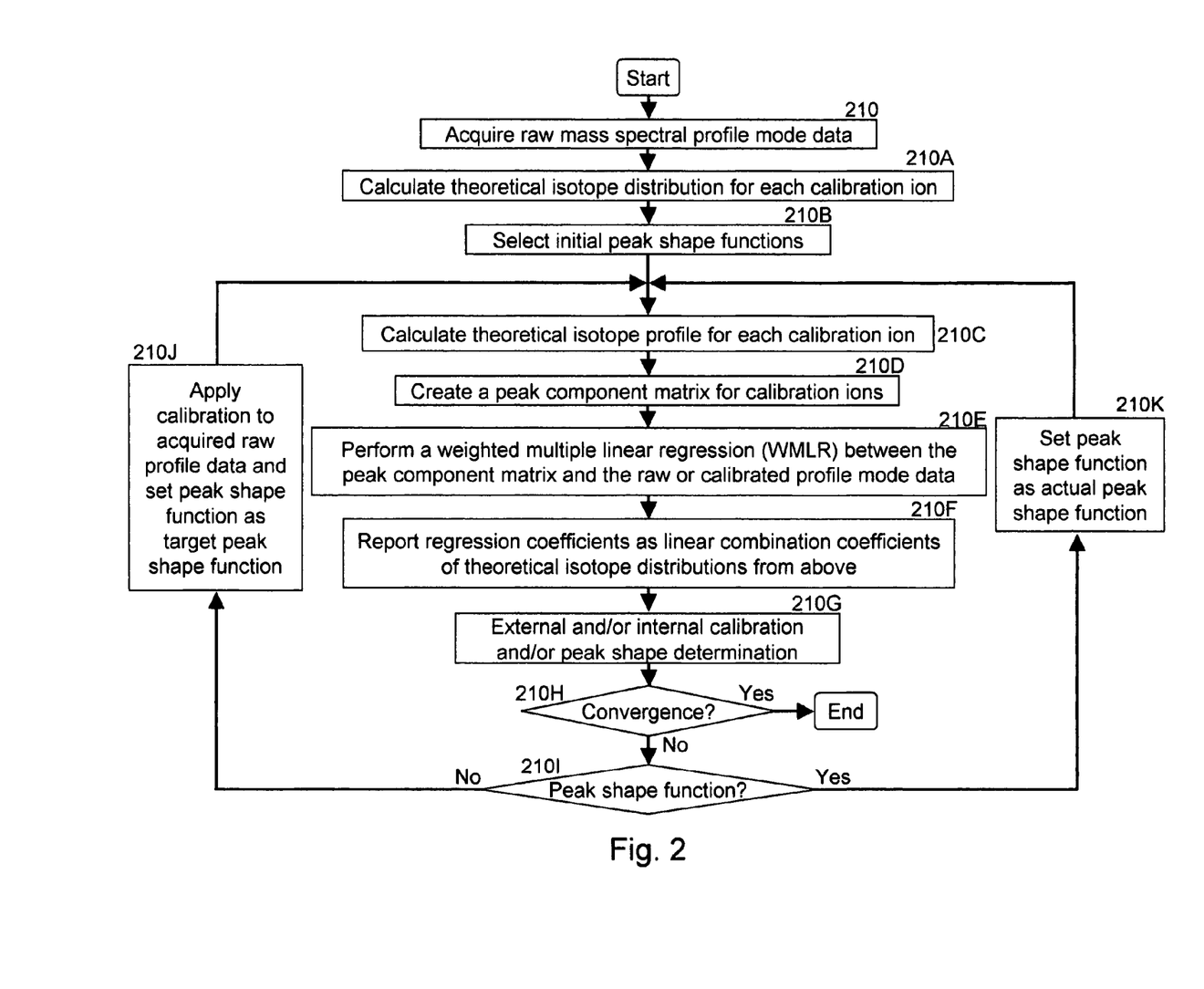
FIG. 2 is a flowchart of mass spectral calibration based on mutually overlapping ions and their isotopes in accordance with the invention.

The steps involved are:

1. Acquire raw profile mode data containing mass spectral responses of these ions and/or their isotopes. This step is shown as 210 in FIG. 2.
2. Calculate the theoretical isotope distributions for each calibration ion based on its elemental composition. This step is shown as 210A in FIG. 2.
3. Convolute the theoretical isotope distributions with an initial peak shape function (step 210B in FIG. 2) to obtain theoretical isotope profile for each ion (step 210C in FIG. 2).
4. Construct a peak component matrix P (page 32 of U.S. patent application Ser. No. 10/689,313 and page 34 in PCT/US2004/034618 filed Oct. 20, 2004) to include any linear or nonlinear functions as baseline components and the theoretical isotope profiles for calibration ions as peak components. This step is shown as 210D in FIG. 2.
5. Perform a Weighted Multiple Linear Regression (WMLR), (equation 6 on page 34 of U.S. patent application Ser. No. 10/689,313 and equation 6 on page 35 in PCT/US2004/034618 filed on Oct. 20, 2004) between the raw continuum mass spectral data and the peak component matrix and report the regression coefficients as the relative concentrations for each of the components including the baseline and calibration ions. These relative concentrations should be free from each other's interference but may have some error due possibly to errors in the initial peak shape functions. This step is shown as 210E in FIG. 2.
6. Using the relative concentrations obtained above as combination coefficients, perform a linear combination of all calculated isotope distributions from step 2. This step is shown as 210F in FIG. 2.
7. Calculate a peak shape function and/or a calibration filter through convolution and deconvolution between the results of steps 1 and 6 according to the procedure outlined on pages 14-32 of U.S. patent application Ser. No. 10/689,313 and pages 14-32 in PCT/US2004/034618 filed on Oct. 20, 2004. This step is shown as 210G in FIG. 2.
8. Apply the calibration filter to raw data from step 1 and perform the convolution in step 3 using the target peak shape function specified for calibration filter calculation (step 210J in FIG. 2). Or alternatively,
9. Perform the convolution in step 3 using the now refined peak shape function (step 210K in FIG. 2).

10. Repeat 4-5-6-7-8 iteratively until the relative concentrations or calibration filter or both converge (loop or iteration involving step 210J in FIG. 2). Or Alternatively, 11. Repeat 4-5-6-7-9 iteratively until the relative concentrations or peak shape function or both converge (loop or iteration involving step 210K in FIG. 2).

In cases where the relative concentrations of the ions are known or given, steps 4-5 for the calculation of relative concentrations and steps 8-11 for iterative improvement can all be omitted resulting in a single pass process.

An alternative to the above operation using continuum profile mode data is to perform peak analysis and peak area integration first on the actual measured or calibrated data. Correspondingly, all isotopes belonging to the same cluster of 1/z spacing (where z is the charge state) are binned into one group. The same WMLR can be performed on this binned or integrated data so that a matrix of a smaller size such as 4 by 6 or 4 by 7 may be handled efficiently beforehand to produce correction coefficients to each observed integrated areas to remove the mutual interferences between different calibration ions prior to mass spectral calibration in profile mode in the absence of ion interferences, as outlined on pages 14-32 of U.S. patent application Ser. No. 10/689,313 and pages 14-32 in PCT/US2004/034618 filed on Oct. 20, 2004.

Another aspect of the invention involves calibration of the $MS^n$ data through the use of known ions and/or its $MS^n$ fragments. The integer n here refers to the number of tandem. MS experiments, for example, $MS^2$ for a straight MS/MS experiment.

One of the key steps in calibrating $MS^n$ data is to create calibration ions that span the mass range of interest in the $MS^n$ mode. One way to create these calibration ions is through the use of a peptide with known amino acid sequence. The peptide, upon fragmentation, forms a sequence ladder composed of smaller peptides of all known amino acids to cover a significant mass range with about 100 Da spacing. Similarly, one can use other types of polymers such as a segment of DNA of known sequences to create a set of calibration ions. Other example of creating a set of calibration ions include tandem MS analysis of a known large molecule with a known fragmentation pattern so that a set of known ions can be observed in the $MS^n$ mode in the mass range of interest and used as a set of calibration ions. In pharmaceutical analysis, a known parent drug molecule already existing in the LC/MS sample can be used as the source of calibration ions upon tandem MS analysis.

Similar to the full mass spectral calibration, the known standard molecule used for generating the set of calibration ions can be introduced into the mass spectrometer either externally without involving a test sample or internally through the measurement of both standard and test sample. An external standard can be introduced into the mass spectrometer through direct sampling of the standard molecule, for example, through infusion. Alternatively, the external standard can also be introduced through a front end separation system such as a liquid or gas chromatography system. An internal standard can be mixed into the test sample during sample preparation offline, or prior to/during/after sample separation, or prior to/during/after ionization. With the use of internal standard, a real time or nearly real time calibration can be accomplish by measuring the internal standard along with the test analytes simultaneously or at least during the same run.

If the calibration molecule is introduced into the sample that then undergoes a chromatographic separation, it will elute at a certain point in time, which will typically not be the same time as the unknown. Therefore, the internal standard thus introduced is a quasi-internal standard for calibration purpose. A combination of external and internal calibration can also be made, as outlined in the U.S. patent application Ser. No. 10/689,313 filed on Oct. 20, 2003 and PCT/US2004/034618 filed on Oct. 20, 2004.

Alternatively, one may consider using the real time calibration derived iteratively from a mixture of known ions such as those used in isotope labeled experiments, including iTRAQ™ set of reagents supplied by Applied Biosytems in Foster City, Calif. As pointed out in the previous section, one can apply the calibration filter/peak shape function to the nearest peptide fragment allowing for accurate mass measurement and precise peptide search using the profile mode searching algorithm disclosed in U.S. provisional patent application Ser. No. 60/623,114 filed on Oct. 28, 2004 and an international patent application filed under the Patent Cooperation Treaty of even date herewith. Once this nearby peptide fragment is identified, its molecular formula becomes known and it can now serve as an internal standard to calibrate for higher masses. This process can be repeated from one mass to another until all peaks in a tandem MS scan have been identified. These peaks may include biologically important impurities, different charge states, and post-translational modifications (PTM) on peptides.

Another aspect of the invention involves achieving higher mass accuracy through higher resolution scan features on an otherwise nominal resolution mass spectrometer, such as the zoom scan feature from an LCQ classic mass spectrometer commercially available from Thermo Electron, Waltham, Mass. The zoom scan plays an essential role in generating high quality tandem mass (MS/MS) spectra. By scanning for a longer time over a very narrow mass range, the zoom scan is able to achieve higher mass resolution than a normal full MS scan (See Schwartz, et al. U.S. Pat. No. 5,182,451). Consequently, the individual isotopic peaks of ions are well separated so that their charge states can be easily determined.

Figure 3:
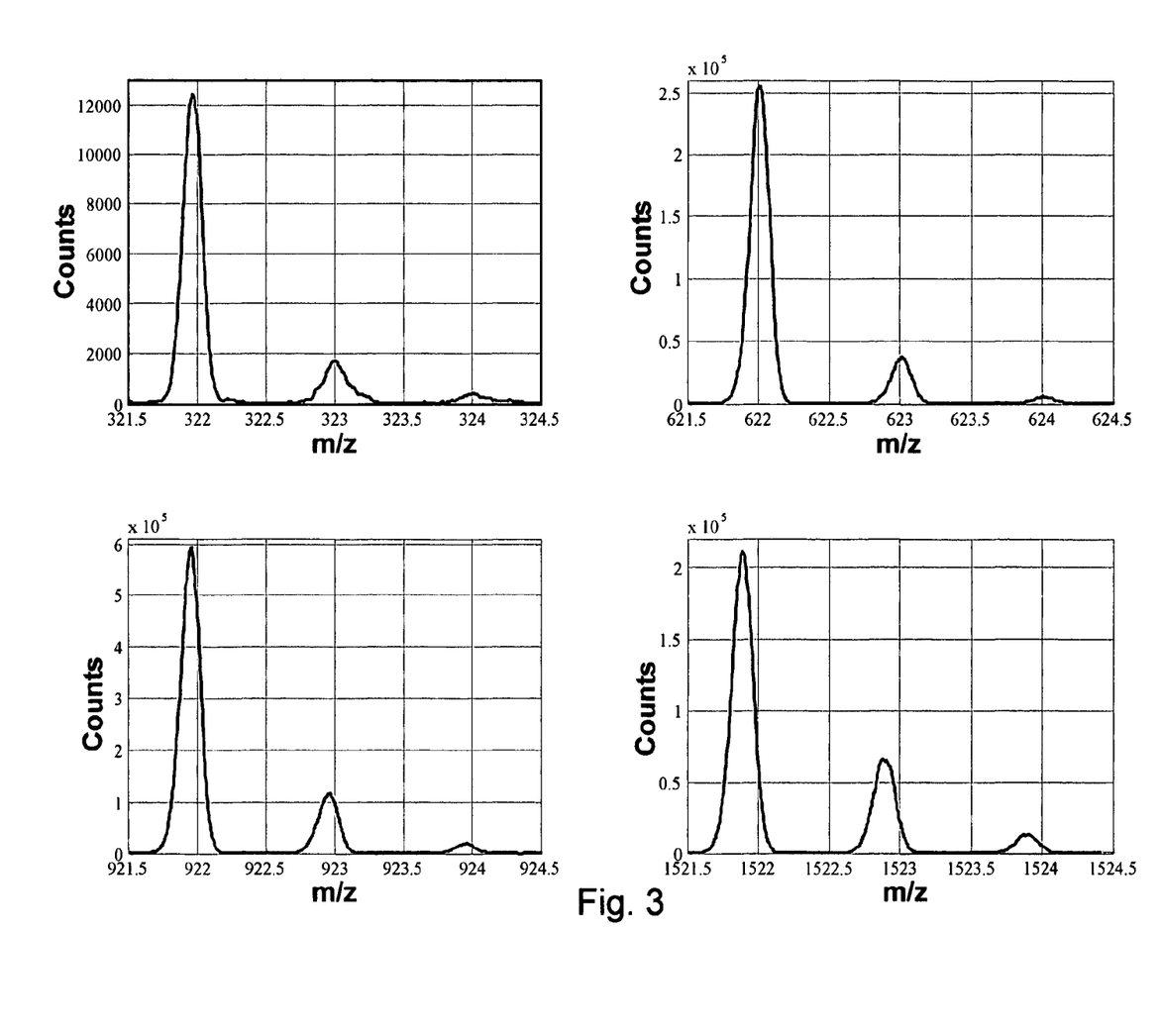
FIG. 3 shows a set of higher resolution mass spectral data collected on an otherwise nominal or unit mass resolution instrument.
Figure 4:
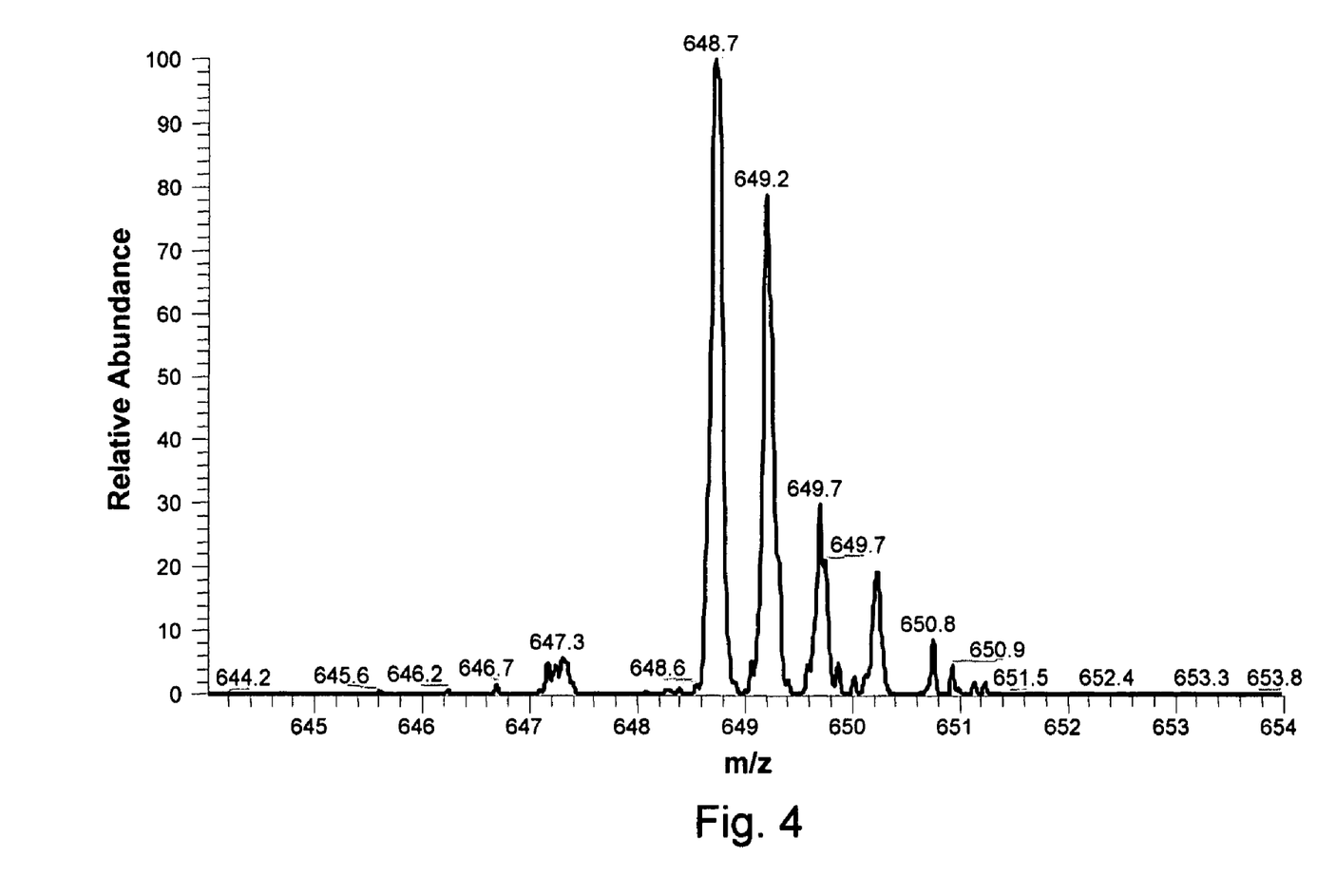
FIG. 4 is a higher resolution mass spectrum collected of a doubly charged ion on an otherwise nominal or unit mass resolution instrument.

This is illustrated by the zoom scan spectra shown in FIG. 3 and FIG. 4. The isotopic peaks of singly charged ions (FIG. 3) are separated by 1 mass unit, while those of doubly (FIG. 4) and triply (data not shown) charged ions are separated by a half and a third of mass unit respectively. In a typical triple-play data dependent acquisition on the LCQ instrument, the zoom scans automatically determine the charge states of the ions of interest. This charge state information helps to setup MS/MS conditions such as scan range and relative collisional energy. For example, if the ion at m/z=500 is singly charged the upper limit of MS/MS scan range can be set to m/z=510, slightly higher than the precursor ions with predefined relative collisional energy for singly charged ions. On the other hand, if the charge state of m/z=500 is double, the MS/MS experiment has to scan up to 1,100, since the doubly charged ions can fragment into singly charged ions which have an m/z value higher than 500 and up to 999. Similarly to the singly charged ions, identification of the doubly charged state of the ions helps set up suitable relative collisional energy for efficient MS/MS fragmentation.

Mass accuracy in theory can be described by the following equation (Blom, K. F. *Anal. Chem.* 2001, 73, 715), $$\sigma_{ppm} = \frac{10^6}{CRS^{1/2}}$$

where $\sigma_{ppm}$ is mass accuracy in terms of standard error in ppm, R is resolving power of a mass spectrometer, S is signal strength, C is a constant including such factors as signal unit conversion to real ion counts, peak sampling interval, peak analysis and mass determination algorithms, etc.

It is clear from the equation that more accurate mass measurements can be achieved from higher resolving power of a mass spectrometer. Taking advantages of the available resolution of the zoom scan feature, it is feasible to further enhance the mass accuracy in the ion trap mass spectrometer, using the technology outlined in the U.S. patent application Ser. No. 10/689,313 filed on Oct. 20, 2003 and PCT/US2004/034618 filed on Oct. 20, 2004. The technology combines external with internal calibration to obtain the exact peak positions with well defined peak shape functions for variously charged ions.

The external calibration standards can be, by way of example, Agilent's electrospray ionization (ESI) tuning solution and a mixture of peptide standards from Michrom Bioresources Inc., Aubrun, Calif. LC/MS analysis is first conducted on a blank sample with the calibration standards infused as a post column addition driven by a syringe pump. The second analysis is for the peptide mixture with the same experimental setup. The mass spectrometry method for the blank run includes full mass scans from 300 to 2,000 and zoom scans for calibration ions of m/z=322, 622, 922, 1522. The zoom scan range is set to ±5 mass units around the ions. The scanning functions for the analysis of peptide mixture are data dependent triple-play data. The sequence of the scans is full MS scans, zoom scans for the most abundant ions detected from the full MS scans, and product ion scans for the same ions.

In the experiments described above, the external calibration is performed by the zoom scan spectra from a blank LC/MS run with infusion of the Agilent's tuning solution. As shown in FIG. 3, the most abundant ions are observed at m/z=922 and the least abundant at m/z=322. All the ions at m/z=322, 622, 922, and 1522 exhibit good signal to noise with virtually no interferences from other ions and are used for external calibration.

If m/z value drift due to minor environmental changes such as temperature occurs for a mass spectrometer, it is important to introduce an internal standard to compensate all the mass spectral change occurring to the analyte of interest. This is illustrated by selecting the ions at 922 Da from the Agilent's tuning solution as the internal standard to perform AM measurements for the peptide ion at m/z=931.

Figure 5:
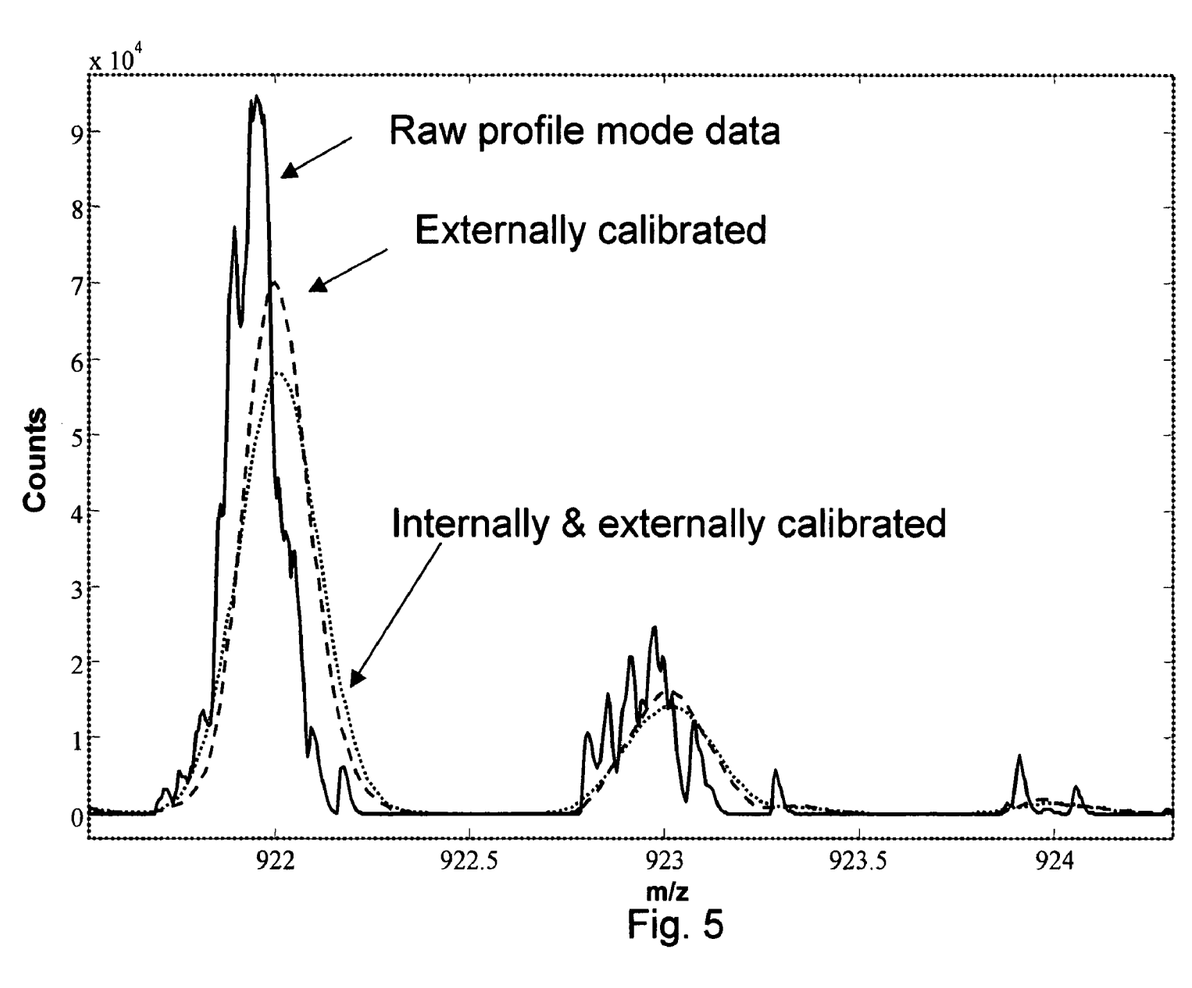
FIG. 5 shows a higher resolution raw, externally calibrated, and internally calibrated mass spectrum on an otherwise nominal or unit mass resolution instrument.
Figure 6:
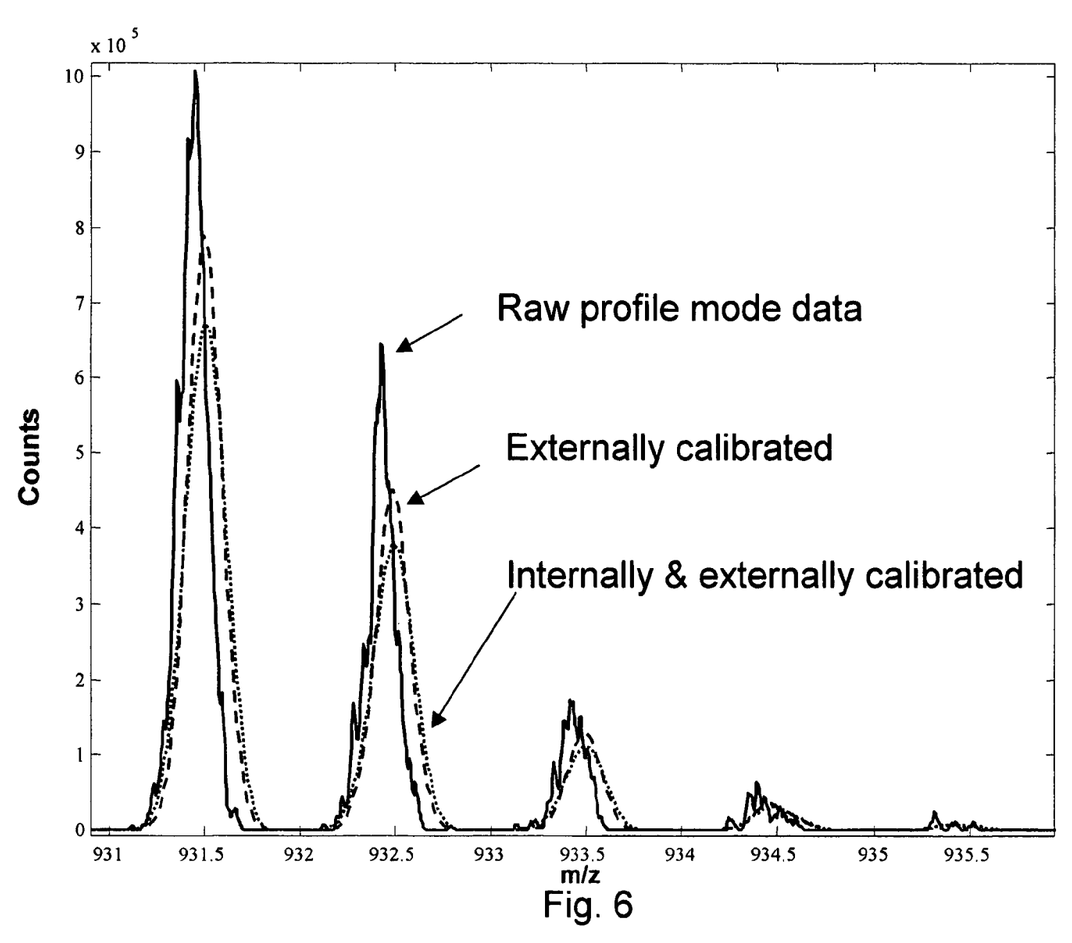
FIG. 6 shows another higher resolution raw, externally calibrated, and internally calibrated mass spectrum on an otherwise nominal or unit mass resolution instrument.
Figure 7:
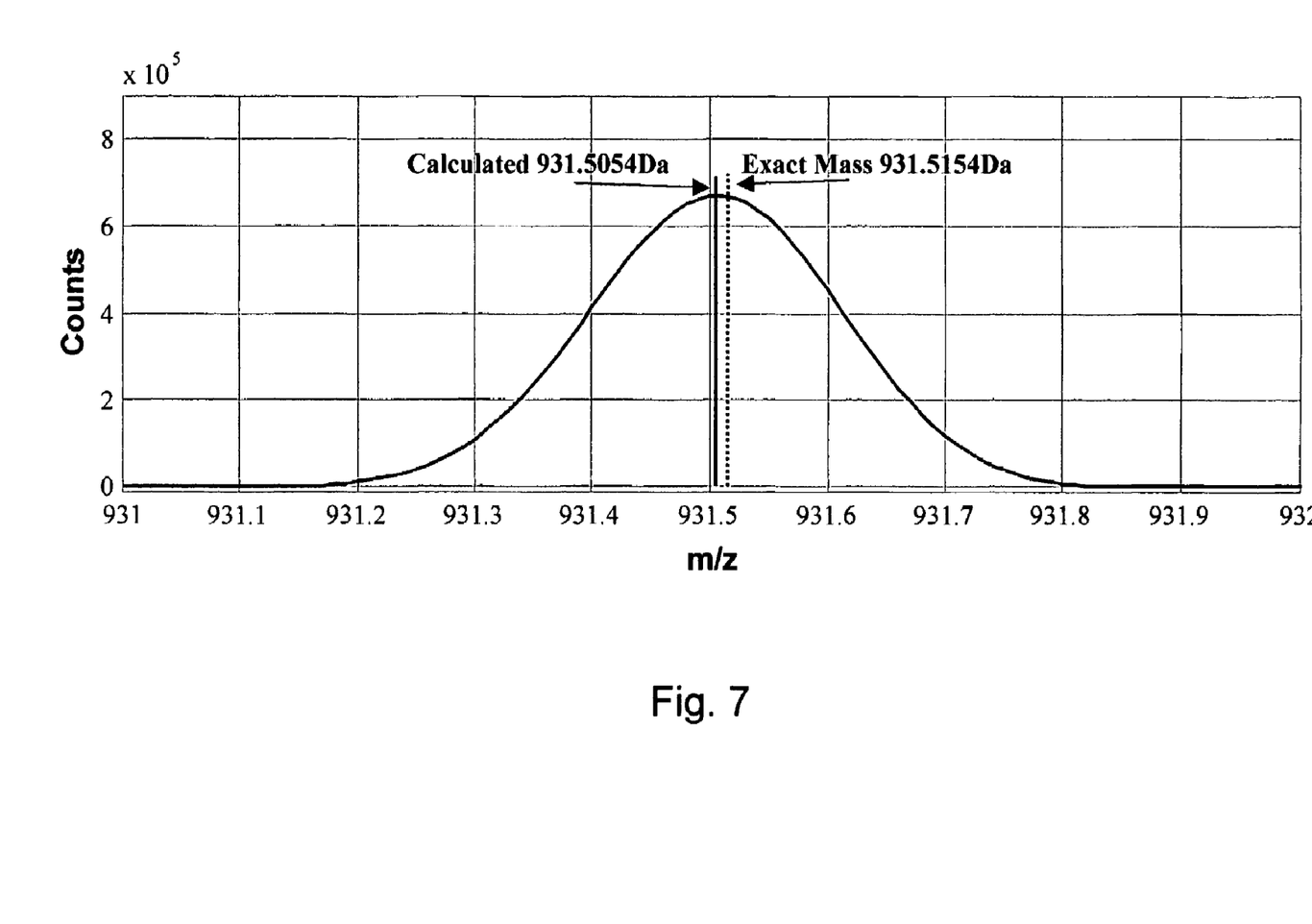
FIG. 7 shows the determination of accurate mass from a calibrated mass spectrum.

FIG. 5 and FIG. 6 show raw and calibrated zoom scan spectra of the internal standard (m/z=922) and the peptide (m/z=931), respectively. It is apparent that the calibration procedures herein integrate all important mass spectral peak processing functions such as noise filtering, smoothing, baseline correcting, peak position finding, and peak area measuring, thus generating peaks with defined peak shape which enables highly accurate peak positioning. As a result, the AM measurement described herein will find the peptide ion at m/z=931.5154 Da, with an error of 11 ppm with respect to the exact mass of 931.5054 Da for this peptide (shown in FIG. 7). A still more accurate result is expected when the internal standard signal intensities are higher. In fact, the zoom scan signal of the internal standard is suppressed when the peptide is eluted from the column, with competing ionization between the analyte and the internal standards introduced as a post column addition. The solution to this problem includes using a dedicated electrospray source for the internal standards, which are available on selected models of mass spectrometers from Waters and Agilent.

AM measurements are becoming the method of choice for a variety of applications. Making AM analysis available on low cost instruments such as LCQ or other quadrupole instruments will benefit the majority of mass spectrometry users. The technology described herein demonstrates that, in accordance with the invention, a low ppm (i.e. high) mass accuracy is achievable on low resolution mass spectrometers and can be further enhanced through higher resolution scan features if available.

Another aspect of the invention deals with the nonlinearity seen in higher resolution mass spectral systems where the more intense monoisotopic peak may be saturated, whereas the less intense M+1 or M+2 peaks are within the linear range. Typical in Time-of-Flight (TOF) instrument, this nonlinearity occurs due to Time-to-Digit Converter (TDC) saturation arising out of its response dead time at high ion flux. This phenomenon is well known in the art, as reported by Esposito et al. in Rev. Sci. Instrum. 62(11), page 2,822. Such nonlinearity is detrimental to high mass accuracy measurement because the currently available mass spectral calibration relies on monoisotopic peak for mass calibration and the monoisotopic peak is typically the most intense (and thus with highest signal to noise, but most vulnerable to saturation) in the mass range below 1,000 Da.

While prior art has attempted to either avoid or correct such nonlinearity by using multiple detectors (U.S. Pat. No. 6,933,497), mathematical corrections (U.S. Pat. No. 6,373,052), or on-the-detector data processing (U.S. Pat. No. 6,870,156), the present invention takes a totally different approach to mass spectral calibration in the presence of such detector saturation, and does so without any changes being necessary to the hardware system.

In the present invention, a satisfactory calibration can be developed using other weaker isotope cluster such as M+1 or M+2 when the monoisotopic peak is saturated, by using only these weaker isotope clusters for calibration without including the monoisotopic peak. The fact that other isotope clusters such as M+1 and M+2 contain multiple closely located and mutually overlapped isotopes does not affect the quality of calibration, according to the comprehensive calibration approach disclosed in U.S. Ser. No. 10/689,313 filed on Oct. 20, 2003 and International Patent PCT/US2004/034618 filed on Oct. 20, 2004.

Figure 8A:
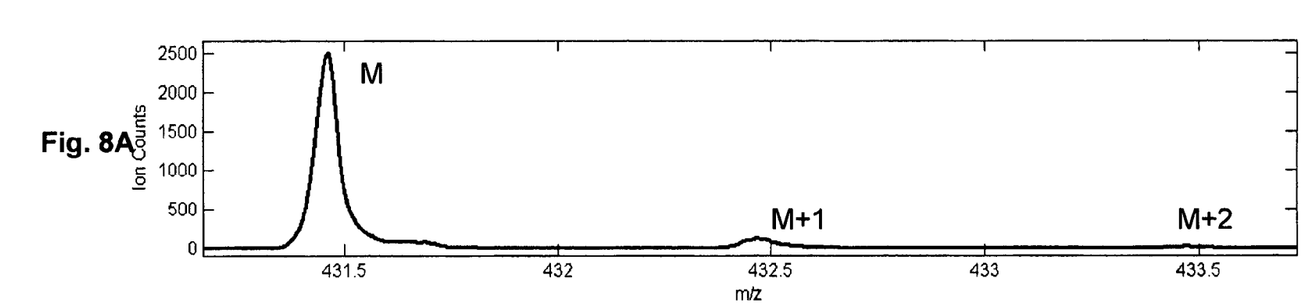
FIG. 8A is a high resolution mass spectrum collected on a qTOF instrument with its monoisotopic peak reaching into the nonlinear range.
Figure 8B:
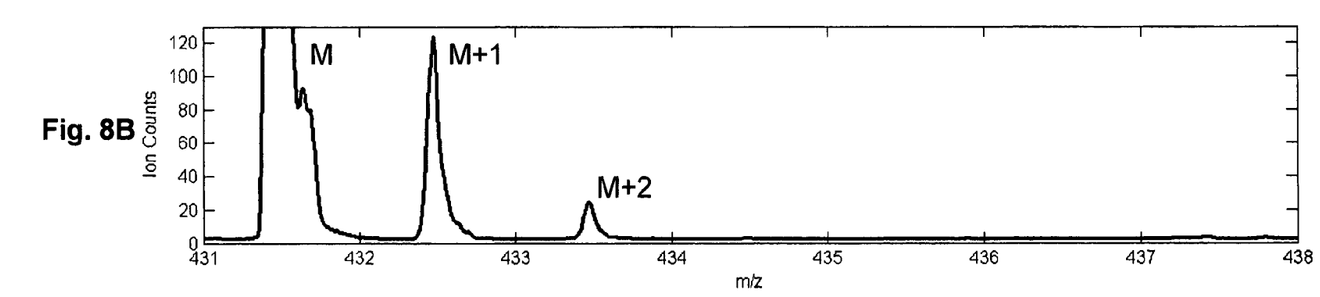
FIG. 8B shows the less abundant M+1 isotope cluster operating in the linear range.
Figure 8C:
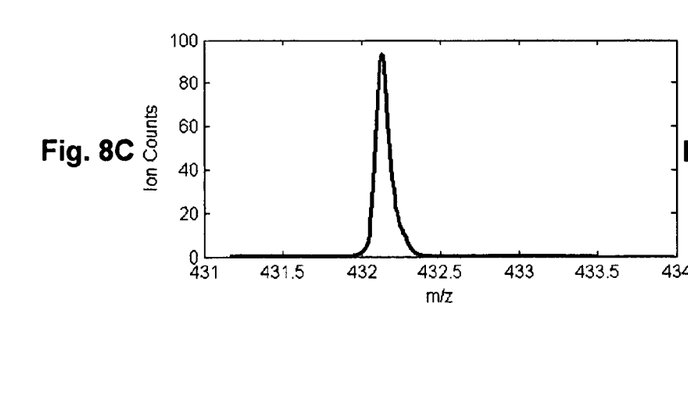
FIG. 8C shows peak shape function determined during the calibration process from the M+1 isotope cluster.
Figure 8D:
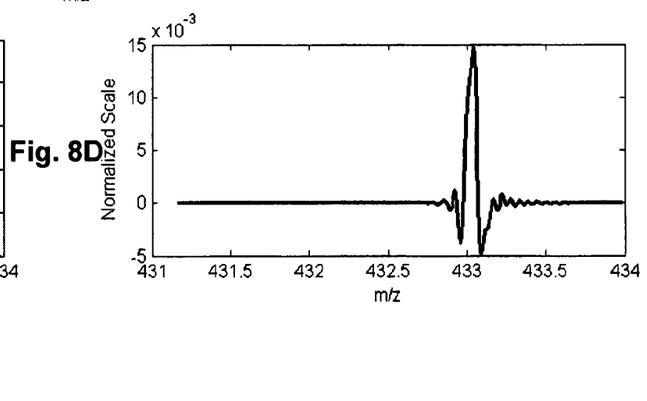
FIG. 8D shows a calibration filter derived from the peak shape function of FIG. 8C.

FIG. 8A shows a strong monoisotopic peak M reaching into the detector nonlinear response range with peak ion counts well over 2,000 on a qTOF mass spectrometer. This peak also has an interference at the right side of the peak as shown in FIG. 8B. A mass spectral calibration based on this peak would have a large error, due to these two reasons. However, the less abundant M+1 signal has good ion counting signal and stays well within the linear response range of the detection system. A peak shape function can be deconvoluted out as shown in FIG. 8C from the M+1 peak with a corresponding calibration filter shown in FIG. 8D.

Similar to mass spectral calibration through the use of less abundant isotope clusters of the same ions, one may use these less abundant isotope clusters in mass spectral data analysis including compound identification through molecular formula or library search, as an effective way to avoid nonlinearity on the more abundant monoisotopic ions. Some of these mass spectral analysis approaches have been disclosed in the U.S. provisional patent application Ser. No. 60/623,114 filed on Oct. 28, 2004 and an international patent application filed under the Patent Cooperation Treaty of even date herewith.

Although the description above contains many specifics, these should not be construed as limiting the scope of the invention but as merely providing illustrations of some feasible embodiments of this invention.

Thus the scope of the invention should be determined by the appended claims and their legal equivalents, rather than by the examples given. Although the present invention has been described with reference to the embodiments shown in the drawings, it should be understood that the present invention can be embodied in many alternate forms of embodiments. In addition, any suitable size, shape or type of elements or materials could be used. Accordingly, the present invention is intended to embrace all such alternatives, modifications and variances which fall within the scope of the appended claims.

What is claimed is:

1. A method for calibrating and analyzing data from a mass spectrometer, comprising the steps of:
   a. acquiring raw profile mode data containing mass spectral responses of ions with or without isotopes;
   b. calculating theoretical isotope distributions for each of at least one calibration ion based on elemental composition;
   c. convoluting the theoretical isotope distributions with an initial peak shape function to obtain theoretical isotope profiles for each ion;
   d. constructing a peak component matrix including the theoretical isotope profiles for calibration ions as peak components;
   e. performing a regression analysis between the raw profile mode mass spectral data and the peak component matrix; and
   f. reporting the regression coefficients as the relative concentrations for each of the components.

2. The method of claim 1, further comprising:
   g. using the relative concentrations as combination coefficients, to provide a linear combination of all calculated isotope distributions of step b.

3. The method of claim 2, further comprising:
   h. calculating at least one of a peak shape function and a calibration filter through convolution and deconvolution between the results of step a. and step g.

4. The method of claim 3, further comprising:
   i. when a calibration filter is calculated, applying the calibration filter to raw data from step a.; and
   j. performing the convolution of step c. using a target peak shape function specified for calculation of the calibration filter in place of initial peak shape function.

5. The method of claim 4, further comprising:
   iteratively repeating steps d. through j. until the relative concentrations or calibration filter or both converge.

6. The method of claim 5, where the process is iterative and includes calculating theoretical isotope profiles based on one of initial estimated peak shape functions and refined peak shape functions.

7. The method of claim 3, wherein:
   k. the convolution of step c. is performed using the peak shape function.

8. The method of claim 7, further comprising:
   iteratively repeating steps d. through h. and k. until the relative concentrations or calibration filter or both converge.

9. The method of claim 1, wherein baseline components are included in the regression analysis.

10. The method of claim 9, wherein baseline components are represented as linear or nonlinear functions.

11. The method of claim 1, where the regression is a multiple linear regression.

12. The method of claim 11, where the multiple linear regression is performed with weights for each mass spectral point.

13. The method of claim 11, where the multiple linear regression is performed with mass spectral centroids after peak analysis on both the profile mode mass spectral data and theoretical isotope profiles.

14. The method of claim 1, where the process is iterative and starts with initial estimated peak shape functions.

15. The method of claim 1, where the process becomes a single pass process when the relative contributions of overlapped ions are known or given.

16. The method of claim 1, where one of actual peak shape function and calibration filter is obtained by using a deconvolution operation involving actual measured mass spectral profile mode data and a linear combination of theoretically calculated isotope distributions.

17. A method for calibrating a mass spectrometer, comprising:
   generating fragment ions of known elemental compositions within the mass spectrometer;
   acquiring profile mode mass spectral data of the fragment ions;
   calculating theoretical isotope distribution for each of the fragment ions; and
   calculating mass spectral calibration filters through at least one of convolution and deconvolution involving the acquired profile mode mass spectral data and theoretical isotope distributions for said ions.

18. A method to avoid mass spectral nonlinearity in one of mass spectral calibration and mass spectral data analysis, comprising:
   acquiring mass spectral data in profile mode in a mass spectral range;
   measuring one of ion counts or relative abundances for isotope clusters within said mass spectral range and comparing to a nonlinearity threshold;
   excluding all the mass spectral sub-regions with nonlinearity from later mass spectral calibration and mass spectral data analysis;
   excluding corresponding isotopes from the theoretically calculated isotope distributions; and
   performing a mass spectral calibration or mass spectral data analysis involving theoretical isotope distributions and acquired profile mode data through one of convolution, deconvolution, and regression operation.

19. A method for calibrating a mass spectrometer for higher mass accuracy than otherwise available, comprising:
   operating the mass spectrometer at a slower scanning and higher resolution mode;

acquiring profile mode mass spectral data containing at least one standard ions of known elemental compositions in one or more mass spectral segments;

calculating theoretical isotope distribution for each of the standard ions; and calculating mass spectral calibration filters through at least one of convolution and deconvolution involving the acquired profile mode mass spectral data and theoretical isotope distributions for said ions.

20. A mass spectrometer system operated in accordance with any one of claims 1 to 19.

21. A computer readable medium having computer readable program instructions readable by the computer for causing a mass spectrometer system to perform in accordance with the methods of any one of claims 1 to 19.

* * * * *